Jan. 5, 1965   M. J. DE GOOD   3,164,246
RECIPROCATING PROPELLING MEMBER CONTROL
Filed Aug. 29, 1963   2 Sheets-Sheet 1

INVENTOR.
MAYNARD J. DE GOOD
BY
ATTORNEYS

INVENTOR.
MAYNARD J. DE GOOD
BY
ATTORNEYS

United States Patent Office 3,164,246
Patented Jan. 5, 1965

3,164,246
RECIPROCATING PROPELLING MEMBER
CONTROL
Maynard J. De Good, Grand Rapids, Mich., assignor to
The Rapids-Standard Company, Inc., Grand Rapids,
Mich., a corporation of Michigan
Filed Aug. 29, 1963, Ser. No. 305,248
6 Claims. (Cl. 198—160)

This invention relates to conveyors, and more particularly to a means by which the power derived from the continuously moving endless propelling member may be applied and controlled for shifting the propelling member position control devices of an accumulator type conveyor. It embodies the principles of and constitutes an improvement over United States Patents Nos. 3,062,359 and 3,012,652.

It has long been recognized in the conveyor industry that powered conveyors, particularly those having an endless chain or belt, have adequate reserve power in the propelling member for operating various types of devices which may be utilized along the conveyors. The invention solves a problem which has been encountered in accumulator type conveyors. In this type of conveyor, the propelling member is supported in such a manner that it is movable toward and away from the articles to control the application of propelling force to the article.

Means are provided to sense the presence of an article and in response to this, the position of the propelling member is shifted to either effect or halt the movement of articles along the conveyor. The sensing of the articles may be done mechanically or by other means which generates a signal, such for example as interruption of a light beam or the tripping of an electrical switch. Where the sensing is mechanical, the weight of the article is normally utilized as the energy source for effecting the physical movement of the propelling member. When other means are used to sense the articles, an auxiliary power source such as a motor, air cylinder or solenoid has been provided to effect movement of the propelling member. These auxiliary power sources are expensive and require an available source of energy such as electricity or compressed air.

In those applications utilizing the weight of the article as the energy source, there is a conflict of purpose between the sensors and the actuation of the propelling member supporting units. If the articles are of reasonably uniform size and weight, the problem does not occur. Where, however, articles of widely varying size and weight are conveyed, the force required to support the propelling member in article propelling position must be such as to assure movement of the heavier and more bulky articles. Since the sensing units must mechanically shift the propelling member from this position, this force must be supplied entirely by the weight of the article actuating the sensing unit. In the case of the small or lightweight articles, it has been found that this force may exceed that which the article can supply with the result that the lighter articles fail to actuate the sensing unit and may become hung-up on the sensing units. In some cases, where only very lightweight articles are involved, the articles are incapable of shifting even the weight of the propelling member itself.

This invention overcomes these problems by providing a means by which the power of the propelling member itself is utilized to effect the shifting of the propelling member between propelling and non-propelling positions. The sensing units are freed of the necessity of providing this force and can be designed to operate with very light pressures. Thus, they are sensitive and can be made to operate with small, lightweight articles.

It provides a positive hold down or lock for the propelling member when retracted which does not require any significant energy from the sensing unit. It also holds the propelling member steady or in non-pulsating position—both when it is raised and when it is lowered. It provides a simple and dependable operating unit characterized by low initial cost and dependable operating unit characterized by low initial cost and minimum subsequent maintenance costs.

These and other objects and advantages of this invention will be immediately understood by those acquainted with the design and use of conveyors upon reading the following specification and the accompanying drawings.

In executing the objects and purposes of this invention, there is provided a conveyor having a continuously driven propelling member. This propelling member is mounted on movable supports whereby it may be shifted from an article propelling position to an article non-propelling position. Driven from the propelling member is an actuator which by means of a motion translating cam reciprocates a bar. The device also includes an arm having a flattened Z-shaped opening. The bar has a finger which passes through this opening. This opening consists of a pair of slots which overlap and communicate at one point. The length and shape of the opening is such that when the finger is in one slot portion of the opening, it reciprocates without moving the arm. When the finger is shifted to the other slot portion of the opening, the arm is forced to move with the finger. By means of a pivoted linkage, movement of the arm by the finger shifts the propelling member support units from raised or extended position to lowered or retracted position. In this latter position, the linkage pesses over center and forms a temporary lock. Until the finger is again shifted to its original slot portion, further reciprocation of the bar will not shift the arm. When, however, the finger is shifted back into the original portion of the slot, it will once more forcibly shift the arm in the opposite direction, relieving the propelling member supporting unit. The unit will then shft back to article propelling position.

Figure 1:
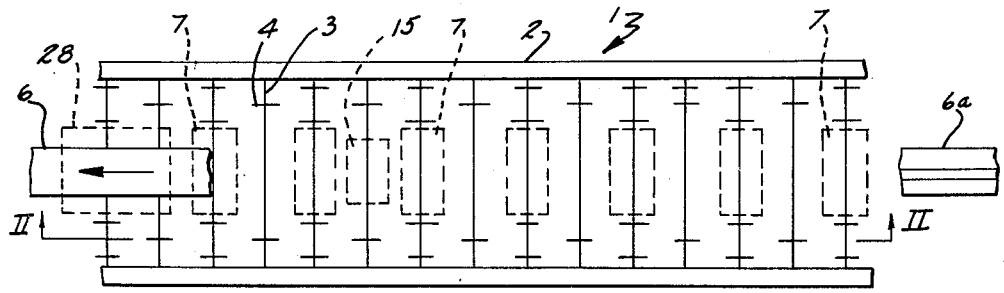
FIG. 1 is a somewhat schematic, fragmentary, plan view of a conveyor equipped with this invention.

Referring specifically to the drawings and particularly to FIG. 1, the numeral 1 refers to a conveyor of conventional design having side rails 2 and a plurality of axles 3 at spaced intervals along the conveyor. The axles 3 mount article supporting wheels 4. At the center of the conveyor is a propelling member 5 having an upper run 6 and a lower run 6a. The upper run of the propelling member is supported on vertically movable supports 7 at spaced intervals.

Figure 2:
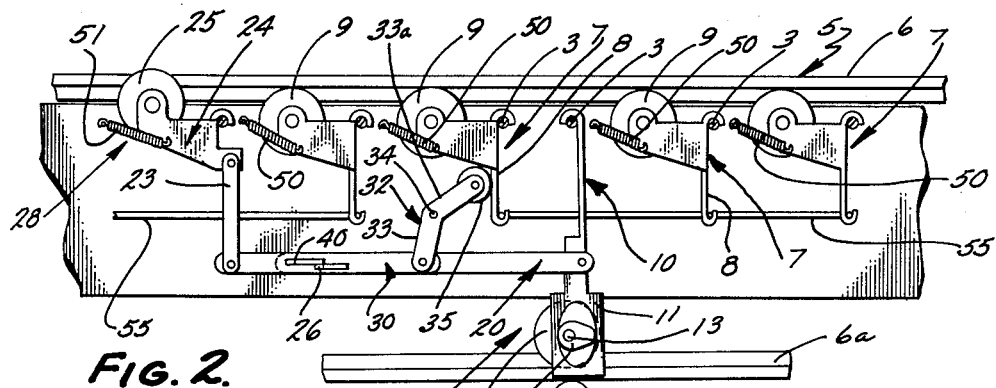
FIG. 2 is a sectional elevational view taken along the plane II—II of FIG. 1.
Figure 3:
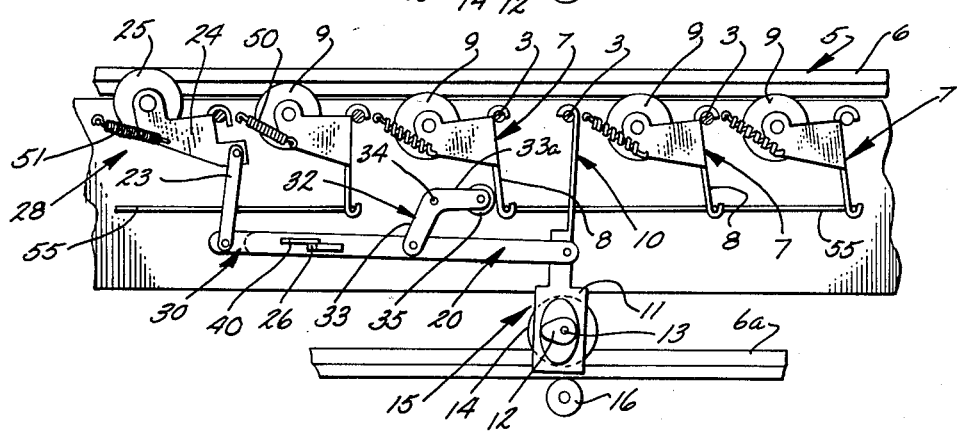
FIG. 3 is a sectional elevatonial vew similar to FIG. 2, but showing the mechanism in retracted position.
Figure 4:
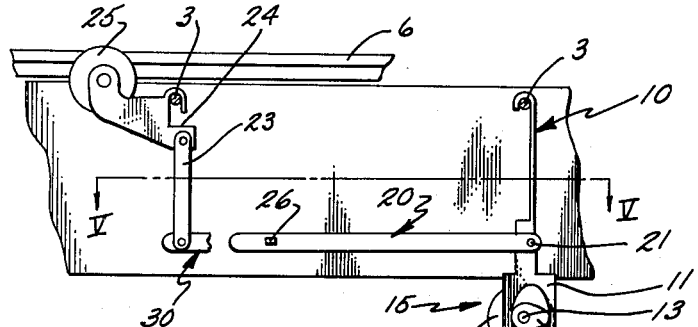
FIG. 4 is an elevational view showing the actuation unit, the reciprocating bar and sensor unit.

As better seen in FIG. 2, the movable supports 7 for the upper run 6 of the propelling member consists of hangers 8. Each of these hangers is pivotally hung from one of the axles 3. Each of these hangers has a pair of projecting flanges which rotatably support wheels 9. The wheels in turn engage the lower side of the propelling member and support it at or slightly above the conveying surface of the conveyor, that being the plane defined by the tops of the conveyor wheels 3.

Figure 5:
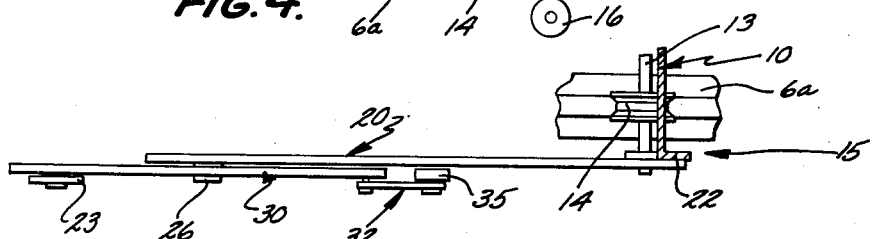
FIG. 5 is a fragmentary sectional plan view taken along the plane V—V of FIG. 4.

Pivotally supported from another one of the axles 3 is a bracket 10. The lower end of the bracket has a ring-like member engaging a cam 12. The cam 12 is mounted on and rotated by a shaft 13 which in turn mounts a power wheel 14. The power wheel 14 engages and is rotatably driven by the lower or return run 6a of the belt 5 (FIG. 5). As suggested in FIG. 2, the lower run of the propelling member can be held up against the wheel 14 by a snubber roller 16. This structural assembly constitutes the power pack or actuation unit 15.

The structure includes a sliding arm 30. One end of the sliding arm is pivotally secured at 31 to the L-shaped lever 32. The L-shaped lever 32 has a pair of legs 33 and 33a extending at a substantial angle to each other. The leg 33 mounts the arm 30. Where the legs join the lever 32 is pivotally mounted to a shaft 34. The free end of the leg 33a mounts a follower 35. This follower engages the depending flange 36 of one of the hangers 8.

Figure 6:
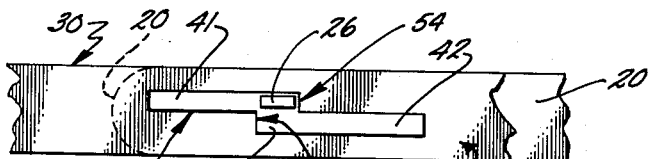
FIG. 6 is an enlarged fragmentary view of one end of the arm showing the relationship between the opening therein and the cooperating finger of the bar.

The arm 30 has an opening 40. The opening 40 consists of an upper slot 41 and a lower slot 42 which overlap and communicate with each other to form a channel 43. This is best seen in FIG. 6.

The other end of the arm 30 is supported by a link 23 from a hanger 24. The hanger 24 also supports a sensor wheel 25 which projects above the surface of the propelling member, whereby it will be engaged and depressed by an article passing along the conveyor. The hanger 24 is pivotally mounted on one of the axles 3 with the sensor wheel on one side of the pivot and the link 23 on the opposite side of the pivot. This structure constitutes a sensing unit 28. Thus, when the sensor wheel 25 is depressed, the link 23 will be raised. It will be obvious that by depressing the sensor wheel 25, the adjacent end of the arm 30 will be raised.

Pivotally secured to the bracket 10 is a bar 20. In the mechanism as illustrated, one end of the bar is pivotally secured by means of a pin 21 to the ear 22 on the bracket 10. It will be seen from observing the structure as just described that rotation of the cam will cause the bracket to swing back and forth in the manner of a pendulum. As it does, this movement will be translated into reciprocating movement of the bar 20. The bar will pass through one cycle of reciprocation for each rotation of the wheel 14.

The other end of the bar 20 has a finger 26 which is received in the opening 40. The vertical height of each of the individual slots 41 and 42 is such that the finger 26 may freely slide in the slots. The width of the channel 43 is such that the finger may freely move vertically between the slots. The length of each of the individual slots 41 and 42 is equal to the length of stroke of the bar 20.

In normal position, the propelling member supporting units 7 are biased into raised position by springs 50. The sensing unit is also biased into raised position by means of a spring 51. This condition is illustrated in FIG. 2. In this position, the finger 26 rides in the upper slot 42. The reciprocation of the bar 20 by the actuating unit 15 causes the finger to move lengthwise of the slot 42, but the finger does not engage either of the end walls of the slot. Thus, no motion is transmitted from the reciprocating bar 20 to the arm 30. Also, in this position, the lever 32 is pivoted into up position where the follower 35 is raised and permits the hanger 8 to be pivoted into raised or active position. This holds the propelling member in article propelling position.

When an article passes over the sensing wheel 25, it depresses the sensing wheel, pivoting the bracket 24. This raises the link 23 and thereby lifts the free end of the arm 30. This in turn shifts the finger 26 from the upper slot 41 to the lower slot 42. In this position, the next extension of the bar 20 by the actuation unit 15 will cause the finger to engage the end wall 44 of the lower slot and push the arm 30 to the left or retracted position.

The shifting of the arm 30 to the left will pivot the link 32 forcing the follower 35 downwardly. As it moves, it will shift to the right, pivoting the hanger 7, lowering the wheels 9. This will permit the portion of the belt supported by the wheels 9 to drop from article propelling to article non-propelling position. While the arm 30 is in its raised and retracted position, it will remain stationary while the bar 20 continues to reciprocate, since the finger 26 will slide back and forth in the lower slot 42 without engaging the end walls of the slot.

When the article moves off the sensing wheel 25, the spring 51 will pivot the hanger 24 to its original position. This will drop the link 23 permitting the finger 26 to move through the channel 43 into the upper slot 41. On the next retraction of the bar 20, the finger will engage the end wall 45 of the slot 41 shifting the arm 30 to the right. This in turn will raise the follower 35 permitting the hanger 7 to return to its normal position. Once again, the propelling member will be restored to article propelling position by the spring 50.

A single hanger 7 may be operated in this manner. It will also be understood as suggested in FIG. 2, that several hangers 7 can be joined together as by connecting links 55 for simultaneous operation by a single actuating unit 15 and its connected mechanism. Any suitable lengths of conveyor can be operated through a single sensor and actuating unit by means of this invention. At the same time, the structure may be repeated at predetermined intervals along the conveyor, as desired, to form independent and separate operating zones. It will also be recognized that one or more of the linkage combinations 20 and 30 may be operated from a single actuation unit 15, each one being controlled by a separate sensing wheel 25.

Figure 7:
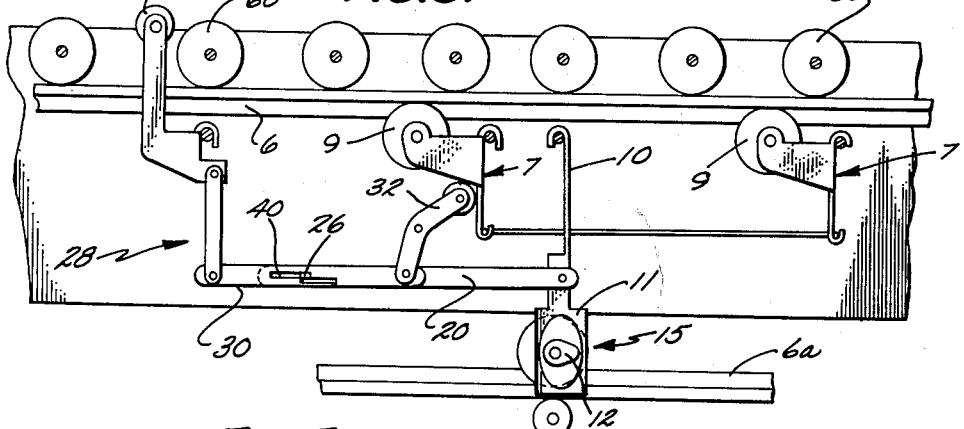
FIG. 7 is a somewhat schematic plan view of a power roll conveyor equipped with the devices of FIGS. 2 and 3 with the propelling member units supporting the propelling member against the driven rollers.

FIG. 7 illustrates the fact that, while this invention has been illustrated as primarily applied to a conveyor of the type in which the propelling member is at the conveying surface, and therefore, makes direct contact with the articles, it may, with equal facility, be applied to live roller conveyors. The structure remains basically the same, except that the upper run 6 of the propelling member 7 is placed beneath the propelling or driven rollers 60 and the effect of the shifting of the wheels 9 is that of engaging and disengaging the propelling member from the rollers 60. In this manner, the movement or non-movement of articles along the conveyor can be controlled.

It will be recognized that the invention frees the sensing wheel 25 from the necessity of providing more energy than is necessary to raise and lower the end of the arm 30. This is minor compared to the necessity of supporting the upper run 6 of the propelling member. Thus, the spring 51 can be extremely light, and the pressure required to shift the sensing unit reduced to a point where very small and lightweight articles are effective to trip the mechanisms and lower the propelling member.

The springs 50 must be strong enough to support the upper run 6 of the propelling member and to assure sufficient bias of the propelling member against the articles to effect transportation. In this invention, this energy requirement is met by energy derived from the propelling member itself through the actuation unit 15. Therefore, it is not derived through the sensing unit. At the same time, since adequate energy is provided to shift the support hanger 7, a number of these hangers can be operated by a single sensing unit without increasing the energy demand upon the sensing unit. This greatly extends the range of capacity of accumulator conveyors, both in the weight of articles with which they may be used, and with respect to the range of weight which may be transported on a single conveyor. At the same time, the mechanism is simple and thus is relatively free of maintenance problems and is not sensitive to the requirement of precise adjustment.

It will be understood that while a preferred embodiment of this invention has been described, other embodiments of this invention incorporating the principles herein disclosed may be utilized. Such modifications of this invention are to be considered as included within the hereinafter appended claims, unless these claims by their language expressly state otherwise.

I claim:

1. In a conveyor for articles, said conveyor having an article conveying surface and an endless driven article propelling member, said propelling member having a forward run and a return run; a pivotally mounted support element for said forward run of said propelling member, said support element being movable to shift said propelling member from an article propelling position to an article non-propelling position; a driven actuation member; a bar engaging said actuation member and reciprocated thereby; a finger on said bar; a slidable arm having a first slot and a second slot, the ends of said slots overlapping and communicating through a common channel to form a somewhat Z-shaped opening receiving said finger, said channel being of such size that said finger may move therethrough from one slot to the other; said arm having means secured thereto which in one position of said arm permits said support element to hold said propelling member in article propelling position and in a second position pivoting said support element to shift said propelling member to article non-propelling position; control means for said actuation member for shifting said finger through said channel from one slot to the other; said finger when in one of said slots reciprocating without shifting said arm and when in the other of said slots shifting said arm to its other said positions.

2. A device as described in claim 1 wherein said actuation member engages and is driven by said propelling member.

3. A device as described in claim 2 wherein said control means is a sensor normally in extended position projecting above said article conveying surface and retractable by articles passing thereover; a linkage connecting said sensor to one said bar and said arm, said sensor upon shifting between said extended and retracted positions shifting said finger from one of said slots to the other thereof and upon shifting again to extended position, shifting said finger to its original slot.

4. A device as described in claim 2 wherein said control means is a sensor normally in extended position projecting above said article conveying surface and retractable by articles passing thereover; a linkage connecting said sensor to said arm, said sensor upon shifting between said extended and retracted positions shifting said arm with respect to said finger causing said finger to travel from one of said slots to the other thereof.

5. In a conveyor for articles having an endless driven article propelling member, said propelling member having a forward run and a return run; a pivotally mounted support element for said forward run of said propelling member, said support element being movable to shift said propelling member from an article propelling position to an article non-propelling position; means biasing said support element to hold said propelling member in article propelling position; an actuation member having a wheel engaging and rotated by said propelling member; said actuation member having a radially extending projection; a bar engaging said projection and reciprocated thereby; a finger on said bar; a slidable arm having an upper slot and a lower slot, the ends of said slots overlapping and communicating through a vertical channel of such size that said finger may move therethrough from one slot to the other; a generally L-shaped lever having one end secured to said arm and pivotally mounted at a point intermediate its ends; the other of its ends engaging said support element; said arm in one position swinging said other end of said lever to a position permitting said support element to hold said propelling member in article propelling position and in a second position swinging said other end of said lever to a position shifting said support element to lower said propelling member to article non-propelling position; means for shifting said arm relative to said finger causing said finger to travel through said channel from said upper slot to said lower slot; said finger when in said upper slot reciprocating without shifting said arm and when in said lower slot shifting said arm to its other said position.

6. A device as described in claim 5 wherein said other end of said arm passes over center with respect to the pivot point of said arm in shifting to said second position to form a locked position holding said support element and propelling member in lowered article non-propelling position; said finger upon being shifted to said upper slot shifting said arm to its initial position and releasing said support element.

References Cited in the file of this patent
UNITED STATES PATENTS 3,062,359   McGow _____ Nov. 6, 1962